US012588688B2

(12) United States Patent
Derensy et al.

(10) Patent No.: US 12,588,688 B2
(45) Date of Patent: Mar. 31, 2026

(54) METHOD FOR PRODUCING AN INGREDIENT COMPRISING A COMBINATION OF AT LEAST THREE MILK PROTEINS AND USE OF THE INGREDIENT OBTAINED

(71) Applicant: INGREDIA, Arras (FR)

(72) Inventors: Antoine Derensy, Henin Beaumont (FR); Pierre Gourdin, Authieule (FR); Rodolphe Leroux, Gouy en Artois (FR); Jean-Jacques Snappe, Festubert (FR)

( * ) Notice: Subject to any disclaimer, the term of this patent is extended or adjusted under 35 U.S.C. 154(b) by 964 days.

(21) Appl. No.: 17/292,773

(22) PCT Filed: Nov. 14, 2019

(86) PCT No.: PCT/FR2019/052705
§ 371 (c)(1),
(2) Date: May 11, 2021

(87) PCT Pub. No.: WO2020/099792
PCT Pub. Date: May 22, 2020

(65) Prior Publication Data
US 2021/0392919 A1 Dec. 23, 2021

(30) Foreign Application Priority Data
Nov. 14, 2018 (FR) ...................................... 18 60501

(51) Int. Cl.
A23J 3/08 (2006.01)
A23C 9/13 (2006.01)
A23J 1/20 (2006.01)

(52) U.S. Cl.
CPC .............. *A23J 3/08* (2013.01); *A23C 9/1307* (2013.01); *A23J 1/202* (2013.01); *A23J 1/205* (2013.01)

(58) Field of Classification Search
CPC ... A23J 3/08; A23J 1/202; A23J 1/205; A23C 9/1307
See application file for complete search history.

(56) References Cited

U.S. PATENT DOCUMENTS 4,271,201 A 6/1981 Stenne
5,714,182 A 2/1998 Bisson et al.
(Continued)

FOREIGN PATENT DOCUMENTS

EP 0696426 A1 2/1996
EP 2340052 A1 3/2010
(Continued)

OTHER PUBLICATIONS

Jorgensen Camilla Elise et al. "Improving the structure and rheology of high protein, low fat yoghurt with undenatured whey proteins", International Dairy Journal, Elsevier Applied Science, Barking, GB, vol. 47, Feb. 28, 2015 (Feb. 28, 2015), pp. 6-18.
(Continued)

*Primary Examiner* — Erik Kashnikow
*Assistant Examiner* — Assaf Zilbering
(74) *Attorney, Agent, or Firm* — Beau de Lomenie

(57) ABSTRACT

A method for producing an ingredient comprising a combination of at least three milk proteins, the method comprising: mixing at least a primary liquid composition, comprising micellar caseins A1, milk serum proteins B1 and denatured milk serum proteins C1, milk serum proteins B1 being different from denatured milk serum proteins C1, said micellar caseins A1, milk serum proteins B1 and denatured milk serum proteins C1 being mixed in liquid form to obtain a mixture; applying at least 50 bars to the mixture; and obtaining the ingredient, wherein: a ratio of the dry mass of micellar caseins A1 to the mass of the total nitrogenous matter (TNM) of the ingredient is greater than or equal to
(Continued)

50%; a ratio of the dry mass of milk serum protein B1 relative to the mass of the solids of the mixture is greater than or equal to 5% and less than or equal to 35%; a ratio of the dry mass of denatured milk serum protein C1 to the mass of the solids of the mixture is greater than or equal to 5% and less than or equal to 45%; a ratio of the dry fat mass to the total dry mass in the ingredient is comprised between 0.2% and 6%. The ingredient. A method of production of a dairy product. The dairy product.

19 Claims, 4 Drawing Sheets

(56)                    References Cited

U.S. PATENT DOCUMENTS 6,495,194 B2    12/2002   Sato et al.
2011/0104332 A1*   5/2011   Remmerswaal ..... A23C 19/054
                                                  426/582

FOREIGN PATENT DOCUMENTS

EP        2124583 B1     4/2012
EP        3071047 B1 *   4/2018   ............. A23C 21/00
FR        2340052 A      9/1977
WO        9705784 A1     2/1997
WO        2007108709 A1  9/2007
WO        2015059248 A1  4/2015
WO        2017037345 A1  3/2017

OTHER PUBLICATIONS

Lo C G et al, "Incorporation of Native and Denatured Whey Proteins into Cheese Curd for Manufacture of Reduced fat, Havarti-type Cheese" Journal of Dairy Science, American Dairy Science Association, US vol. 81 No. 1, Jan. 1, 1998 (Jan. 1, 1998), pp. 16-24.
Isabel Celigueta Torres et al. " Effect of microparticulated whey protein with varying content of denatured protein on the rheological and sensory characteristics of low-fat yoghurt" International Dairy Journal, Elsevier Applied Sience, Barking, GB vol. 21, No. 9, Dec. 29, 2010 (Dec. 29, 2010), pp. 645-655.
Effects of disulphide bonds between added whey protein aggregates and other milk components on the rheological properties of acidified milk model systems.
Interactions in heated milk model systems with different ratios of nanoparticulated whey protein at varying pH.
The microstructure of set-style, natural yogurt made by substituting microparticulate whey protein for milk fat.
Effects of added whey protein aggregates on textural and microstructural properties of acidified milk model systems.

* cited by examiner

———— Stirred yogurt 1     — — — Comparative stirred yogurt 1

METHOD FOR PRODUCING AN INGREDIENT COMPRISING A COMBINATION OF AT LEAST THREE MILK PROTEINS AND USE OF THE INGREDIENT OBTAINED

The present invention relates to the production of an ingredient resulting from the transformation of milk proteins, in particular comprising micellar caseins and milk serum proteins, as well as the use of such an ingredient, in particular in the production of dairy products.

BACKGROUND OF THE INVENTION

Nutritional recommendations for fighting obesity including eating less fat, less salt, less sugar, reducing portion sizes and reducing meat consumption, among other things. Unstructured meals and new dietary habits lead consumers to seek healthier products enriched in protein, such as nutritious snacks.

In this context, the demand for yogurt and fermented milk enriched in protein is increasing.

There is therefore a need for food products, in particular dairy, such as cheeses, yogurts, ice creams or beverages with improved nutritional properties, especially reduced fat or fat free and/or protein enriched. However, reducing the fat content of a food product, especially dairy, and/or enriching it in protein, can change its functional properties, especially sensory ones (taste, appearance, texture, etc.).

Thus, for purposes of improving the functional properties of food products, especially dairy, such as, for example, creaminess and texture, food ingredients are sought that can be added at different stages of production of the food product.

Moreover, since milk serum proteins are by-products obtained after conversion of milk, especially in cheese production, different means of making use of them are sought.

Denatured serum proteins are also known as substitutes for fat in low fat food products.

WO 2017/37345, WO 2007/108709 and WO 97/05784 describe various methods for denaturing milk serum proteins.

EP 0696426 A1 describes the production of a texturing agent to improve the features of dairy products comprising advanced heat treatment of a composition comprising skim milk with added serum proteins, in order to make it precipitate, followed by the application of a pressure of 300-400 bars to homogenize it, and atomization, again applying a high pressure to obtain a powder. The texturing agent comprises less than 25% by mass relative to its dry mass of caseins.

EP 2340052 A1 describes the production of a cheese rather than an ingredient seeking to improve the organoleptic properties of a dairy product. A portion of the soluble proteins of the initial milk is replaced by denatured serum proteins. The proportion by mass of native serum proteins is greater, approximately at least twice as high, than the proportion by mass of denatured serum proteins. The ratio of the dry fat mass to the total dry mass in the ingredient in cheese is around 42%.

WO 2015/059248 describes a production method for denatured milk serum proteins reduced in fat with a significant quantity of soluble caseinomacropeptide (CMP). This denatured serum protein composition will improve the emulsifying properties of food products containing them without forming a gel and will retain their low viscosity. In the examples, the denatured serum proteins are added in powder to skim milk, with other ingredients also added individually in powder, such as caseinates or serum protein concentrates whose fraction by mass in serum proteins varies.

The present invention concerns a dairy food ingredient intended to improve functional properties, particularly sensory properties, of food products, in particular dairy.

There is a need to improve the sensory properties of nutritional products, in particular milks, enriches in protein and or reduced in fat, and, in particular, from an ingredient predominantly comprising micellar caseins.

SUBJECT AND SUMMARY OF THE INVENTION

The invention has for a subject, according to a first aspect, a method for producing an ingredient comprising the combination of at least three milk proteins, characterized in that it comprises:

i) mixing a primary liquid composition, comprising micellar caseins A1, milk serum proteins B1 and denatured milk serum proteins C1, milk serum proteins B1 being different from denatured milk serum proteins C1, and micellar caseins A1, milk serum proteins B1 and denatured milk serum proteins C1 are mixed in the liquid form;

and a step ii) comprising a step of applying at least 50 bars to the mixture obtained in step i);

ii) obtaining the ingredient.

Moreover, the ratio of the dry mass of micellar caseins A1 to the mass of the total nitrogenous matter (TNM) of the ingredient is greater than or equal to 50%; the ratio of the dry mass of milk serum proteins B1 to the mass of the solids of the mixture in step i) is greater than or equal to 5%, and less than or equal to 35%; the ratio of the dry mass of denatured milk serum proteins C1 to the mass of the solids of the mixture in step i) is greater than or equal to 5% and less than or equal to 45%; the ratio of the dry fat mass to the total dry mass of said ingredient is comprised between 0.2% and 6%.

Surprisingly, the inventors discovered that the combination by liquid method of the three proteins A1, B1 and C1 makes it possible to obtain a more homogenous mixture and creates interactions that are not obtained when these proteins are mixed in the powdered state.

Thus, when the ingredient according to the invention is transformed into powder and then rehydrated, it is observed that the rehydration rate is clearly improved compared to the three proteins A1, B1 and C1 each mixed in the powdered state, the mixture being then rehydrated.

Moreover, it was also observed that rehydrated solutions according to the invention have a quantity of available protein (i.e. not decanted) very significantly higher than that observed for the mixture of the three proteins in the powder form.

The ingredient according to the present invention also makes it possible to improve the functional properties of food products, for example the creaminess and mouthfeel of a cream cheese, compared to the addition of the three proteins A1, B1 and C1 in the form of a mixture of three powders.

A non-exhaustive and non-limiting explanation of the improvements obtained would reside in the creation of the interactions among the various proteins used. Advantageously, the combination of the three proteins A1, B1 and C1 in the ingredient would be an assembly of these three proteins.

In this text, when a value is indicated as being comprised between x and y, this means that the lower and upper limits x and y are included.

Step ii) can also comprise a concentration step and a heat treatment step applied to the mixture resulting from step i), or a combination of these.

Milk

According to the CODEX *Alimentarius* definition, milk is the normal mammary secretion of milking animals obtained from one or more milkings without either addition to it or extraction from it, intended for consumption as liquid milk or for further processing. (for example cheese production).

The name "milk" without indicating the species of animal, is reserved for cow milk according to French legislation. Any milk coming from a female dairy animal other than cows must be designated by the species name from which it originates followed by the name "milk", for example goat milk, sheep milk, donkey milk or buffalo milk.

In the context of the present invention, "milk" means a milk coming from a milking animal regardless of the indication of animal species.

Milk Proteins

Preferably, according to the definition of the CODEX *Alimentarius*, milk proteins are defined as milk products containing a minimum of 50% milk proteins calculated according to the dry matter (nitrogen×6.38). Total nitrogenous matter (TNM) thus includes milk proteins and non-protein nitrogenous matter.

Milk proteins include caseins and serum proteins. Caseins represent at least 80% by mass of the total mass of milk proteins. Serum proteins represent at least 20% by mass of the total mass of milk proteins (and are soluble at a pH of 4.6).

Casein Proteins

Caseins are organic complexes made up of casein proteins in the form of a loose, tangled chain that chemically binds calcium phosphate. These proteins have a low level of secondary organization (in a helices or β sheets). The following caseins are distinguished in cow milk: αS1, αS2, β and K, in proportions of 37%; 10%; 35%; and 12% (w/w). They are small proteins whose molecular mass varies between 19 and 25 kDaltons. Caseins are organized into micelles: these are spherical particles formed by the association of different caseins.

The organization of a micelle, i.e., the arrangement and distribution of the various constituents as well as their modes of associating are still hypothetical. The uncharged parts of caseins will form rigid structures held by hydrophobic associations and hydrogen bonds. Calcium phosphate will act as a cement that allows the association of caseins into micelles. K-casein will be distributed into heterogenous packets nearly exclusively located at the micelle surface. K-casein is associated with the micelle by its hydrophobic N-terminal part while its hydrophilic C-terminal part forms 5 to 10 nm projections in the aqueous phase, thus giving the micelle a "hairy" appearance. Caseins have the property of being able to precipitate at a pH of 4.6 (isoelectric point) or under the action of certain enzymes such as rennet, in the presence of ionized calcium and at a temperature above 15° C. The milk proteins remaining after isoelectric precipitation of caseins are serum proteins.

In this text, micellar casein, especially micellar casein A1, means any casein obtained from milk isolate (i.e., retentate), in particular resulting from the use of one or more filtration methods, especially membrane filtration, of the milk (such as ultrafiltration, microfiltration, diafiltration or combinations thereof), optionally combined with a step or steps of concentration and/or dilution of said micellar casein.

Micellar casein can be obtained by filtration of milk, in particular by a step of microfiltration, especially membrane microfiltration, of milk.

Preferably, micellar caseins A1, especially liquid composition A defined below, result from a retentate from the milk membrane filtration step (ultrafiltration and/or microfiltration and/or diafiltration). The retentate can undergo one or more steps of concentration in casein proteins (for example evapoconcentration) and/or dilution in casein proteins.

Preferably, micellar proteins A1 are not and/or do not comprise caseinates (which are denatured caseins).

Preferably, micellar caseins A1 are native micellar caseins (i.e., have not undergone enzymatic and/or chemical denaturing, for example by the addition of acids or coagulant enzyme(s)).

Lactoserum

Lactoserum, also called serum or whey, is the liquid part that results from the coagulation of milk. Two kinds of wheys are distinguished: those from production in acid medium of caseins or fresh cheeses (acid whey); and those from production of caseins using rennet and cooked or semi-cooked hard cheeses (mild whey).

Whey is generally sold in the powder form. The powder can be rehydrated in order to form a liquid whey composition.

Liquid whey comprises, in addition to water, at least 70% by mass relative to the total dry mass, of lactose, at least 10% by mass relative to the total dry mass (especially between 10-13%) of soluble proteins. Whey can also comprise vitamins (especially thiamine-B1, riboflavin-B2 and pyridoxine-B6) and minerals (mainly calcium).

Milk Serum Proteins

Milk serum protein, or so-called native or undenatured milk serum protein, in particular milk serum protein B1, can be obtained from a liquid cheese production serum (by-product of cheese production) or else be obtained by (ultra) (micro)filtration, in particular membrane filtration, of milk, or rehydration of a powder, for example of a serum protein concentrate powder.

A serum protein concentrate resulting from cheese production, in particular in its liquid form, is a whey fraction from which lactose is partially removed to increase the dry mass proportion of serum proteins to at least 25%, preferably at least 30% by mass of the total mass of the serum protein concentrate. Preferably, serum proteins are primarily made up of β-lactoglobulin, α-lactalbumin proteins. They can also comprise immunoglobulins, bovine serum albumin, lactoferrin and enzymes (lipases, proteases, etc.).

In the present text, a milk serum protein solution is understood to mean any solution that is left after the casein has been removed, in particular concentrated.

Serum proteins are important in the determination of the thermal stability of dairy protein concentrates.

Denatured Milk Serum Proteins

Serum protein can be denatured. Denatured, and in particular concentrated, serum protein is preferably obtained after a denaturation step, and optionally an aggregation step, of the serum protein, in particular so-called native or undenatured protein or milk serum protein B1.

In a preferred embodiment, the denatured milk serum protein is obtained by implementing the following steps:

a) providing a composition, especially a liquid composition, comprising milk serum proteins, especially undenatured proteins, in particular a milk serum concentrate, especially a non-denatured concentrate.

b) heat treatment of the composition of step a); and/or c) mechanical treatment, especially allowing the application of a pressure of at least 30 bars on a continuous flow of the liquid composition comprising the milk serum proteins, in particular of at least 60 bars (the duration of application of the pressure is therefore simultaneous, for example at least 1 second). This mechanical treatment can be a particulation step using at least one homogenization head;

d) optionally cooling;

e) obtaining denatured milk serum proteins, preferably of a size greater than or equal to 0.1 μm, more preferably less than or equal to 100 μm.

EP 2124583 B1 describes an example of a method for denaturing milk serum proteins making it possible to obtain protein C1 suitable for the implementation of the invention.

Preferably, at least 70% by mass, still more preferably at least 80% by mass, preferentially at least 90% by mass, of the total mass of denatured milk serum C1 protein particles, in particular in liquid composition C, has a particle size greater than or equal to 0.1 μm and less than or equal to 100 μm, still more preferably greater than or equal to 1 μm and less than or equal to 20 μm, preferentially greater than or equal to 5 μm and less than or equal to 10 μm.

The particle size is preferably determined by static diffusion of light via a Mastersizer 3000 particle size analyzer (Malvern Instruments Limited, Malvern, UK). The device is equipped with an He/Ne laser with a capacity of 4 mW and functions at a wavelength of 632.8 nm. This system detects particle sizes between 0.1 and 3500 μm.

Preferably, the heat treatment in step b) comprises heat treatment at a temperature greater than or equal to 90° C. for at least one second, especially at least one minute, still more preferably for at least ten minutes, of the composition of step a), in particular at a pressure greater than or equal to 4 MPa or 40 bars, especially less than or equal to 8 MPa or 80 bars. Preferably, the heat treatment is carried out on a tubular exchanger.

Preferably, the mechanical treatment of step c) comprises the application of a pressure (notably a shearing pressure) to the composition, obtained at the end of step a) or b), of at least 30 bars or 3 MPa, especially at least 60 bars or 60 MPa, in particular by means of one, especially two, homogenization heads.

Generally, denatured serum proteins are preferably produced by heating a serum protein solution, in particular undenatured or so-called native proteins, while subjecting the solution to substantial shearing.

In this text, denatured milk serum proteins are understood to mean any milk serum protein having physical and functional properties different from those of so-called native milk serum proteins or corresponding to serum proteins B1, in particular any so-called native milk serum protein heated at above 60° C., preferably at least 80° C. for at least one second, especially for at least five minutes (especially more than one hour).

In this text, solids by mass or dry mass (total) is understood to mean the dry mass of a liquid mixture, concentrate or composition, obtained after evaporation of the water until a stable total dry mass is obtained. Preferably, the solids mass is calculated using ISO standard 6731: January 2011 "Milk, cream and evaporated milk—Determination of total solids content (Reference method)".

Generally, a powder protein concentrate, or the ingredient according to the invention in powder, has a dry mass, for example according to the standard defined above, comprising at most 6% by mass of water.

The various milk filtration techniques, in particular for obtaining milk protein concentrates rich in micellar caseins or in serum proteins, called native, are well known to the skilled person, and can be implemented to obtain the protein concentrates used in the present invention.

Proteins A1, B1 and C1 implemented, and notably assembled, by liquid method, can result directly after preparation of the milk, or by rehydration of powder, preferably proteins A1 and/or B1 and/or C1 result from a milk isolate (or possibly a liquid serum from cheese production in the case of proteins B1 and/or C1) obtained without rehydration of a powder.

Proteins A1, B1 and C1, and optionally liquid compositions A, B and C defined below, are in the liquid form during mixing for the preparation of the primary composition; they can result directly from milk filtration processes or be reconstituted from so-called native or denatured powdered casein or serum proteins that are rehydrated.

In one embodiment, the primary composition obtained in step i) is obtained by mixing at least two liquid compositions, a first liquid composition comprising proteins A1 and B1, and a second liquid composition comprising proteins C1.

In another embodiment, the primary composition is obtained by rehydration of at least two powders, each powder corresponding to a milk protein concentrate chosen from among: a milk protein concentrate of micellar caseins A1, a milk protein concentrate of serum proteins B1, and a milk protein concentrate of denatured serum proteins C1, or a mixture thereof, in a liquid milk protein concentrate chosen from among: a milk protein concentrate of micellar caseins A1, a milk protein concentrate of serum proteins B1, and a milk protein concentrate of denatured serum proteins C1, or a mixture thereof, preferably a milk protein concentrate of micellar caseins A1. The powders are chosen so that the primary composition comprises at least proteins A1, B1 and C1.

In another preferred embodiment, the primary composition is obtained by mixing the three liquid compositions A, B and C defined below.

Preferably, the mixing in step i) is done by slow mechanical stirring, in particular by a pendulum agitator, in particular at a rotation speed greater than or equal to 50 RPM and less than or equal to 300 RPM. The mixing time is preferably at least 30 minutes and at most 24 h.

Preferably, the mixture (obtained) in step i) has a pH greater than or equal to 6.00, more preferably greater than or equal to 6.70.

Preferably, this pH is maintained during step ii). The mixture is preferably at a temperature greater than or equal to 2° C. and less than or equal to 15° C. during step i). The mixture and/or proteins A1, B1 and C1 in the liquid form during mixing can then be cooled to reach this temperature range if necessary.

The primary composition is mixed until a homogenized mixture is obtained.

The mixing in step i) can be done online for liquid compositions A, B and C supplied by means of an automated feed device, the turbulent flow in each of the conduits for supply with liquid compositions A, B and C ensures that compositions A, B and C are mixed and that a homogenized mixture is obtained.

Preferably, the concentration step during step ii) comprises evaporation, especially under vacuum, in particular by heating to a temperature less than or equal to 80° C., notably less than or equal to 65° C., of a portion of the water contained in the primary composition in order to increase its solids. Preferably, the vacuum is greater than or equal to 0.03 bars and less than or equal to 0.25 bars. The duration of application of the concentration step depends on the amount of dry material sought, especially less than one minute.

The concentration can be done by means of a falling film evaporator and/or a scraped surface, in particular under a stress of 50 RPM at 45° C.

Preferably, the mixture resulting from step ii) (before optional atomization) has a solids by mass greater than or equal to 5% and less than or equal to 40%, more preferably greater than or equal to 10%, preferentially greater than or equal to 15%.

In a sub-variant, step ii) is/comprises a step of applying at least 50 bars, preferably at least 100 bars, especially less than or equal to 500 bars, to the mixture obtained as a result of step i).

In one embodiment, during the step of applying at least 50 bars, the mixture is subjected to a pressure greater than or equal to 50 bars (5 MPa), especially greater than or equal to 100 bars, and less than or equal to 500 bars (50 MPa), preferably less than or equal to 300 bars or 400 bars (30 MPa or 40 MPa).

The step of applying at least 50 bars done during step ii) (to combine proteins A1, B1 and C1 together) can comprise, as described below, a homogenization of the mixture of step i) comprising passage through one or more homogenization heads; (then) and/or pumping the mixture of step i) at high pressure, (then) and/or, its atomization comprising passage through one or more spray heads. Since each of these sub-steps applies a pressure (bars) on the mixture obtained after step i), the sum of these pressures is then equal to the pressure indicated in step ii). Preferably, the high pressure pumping of the mixture obtained in step i) applies a pressure greater than or equal to 10 bars, more preferably greater than or equal to 20 bars, preferentially greater than or equal to 30 bars, especially greater than or equal to 50 bars. The duration of application of the shear during pumping is simultaneous with the flow of the mixture, in particular at least one second. Preferably, step ii) comprises:

a thermal treatment step, especially a pasteurization step;

a concentration step;

a step of applying at least 50 bars, in particular at least 100 bars.

The mixture therefore goes from 1 bar (atmospheric pressure) to the target pressure, then the pressure is reduced to a pressure below the target pressure. The pressure application time is less than one second, preferably less than 15 seconds, preferably at least 30 seconds, more preferably at least one minute. This step allows homogenizing the mixture by shearing it. Generally, the application of pressure, and therefore shear, on the mixture of step i) by passage through a homogenization head or a spray nozzle or even by high pressure pumping is simultaneous with its flow; the duration of application is therefore very short.

Preferably, the mixture has a temperature greater than or equal to 5° C. and less than or equal to 60° C. during this step of applying at least 50 bars. This step can be done by using a high pressure pump pumping the mixture then passing it through at least one homogenization head applying a given pressure (for example 50 bars or 100 bars). The number of homogenization heads may be one or two. The ingredient obtained is then liquid.

This step can also be done using one or more high-pressure spray nozzles also implementing a high-pressure pump, each spray nozzle applying at least 100 bars, for example, especially between 100 bars and 250 bars. This step is equivalent to an atomization step known in the field and also makes it possible, with concomitant drying, to obtain a powdered ingredient.

The spray nozzle or nozzles can be combined with passage through one or more homogenization heads, homogenization being done first.

In a sub-variant, step ii) is/comprises a thermal treatment step ii), which is a pasteurization step or a step during which the mixture is heated at a temperature greater than or equal to 65° C. for at least 5 seconds, especially less than 5 minutes, preferably at a temperature greater than or equal to 70° C., more preferably at a temperature greater than or equal to 80° C., optionally at atmospheric pressure or under vacuum and/or with stirring.

Preferably, the mixture resulting from step ii), especially concentration, has a viscosity greater than or equal to 50 cP and less than or equal to 500 cP.

Preferably, the mixture resulting from step ii) has a solids by mass greater than or equal to 5% and less than or equal to 40%, more preferably greater than or equal to 10%, preferentially greater than or equal to 15%.

Preferably, step ii) comprises, in this order: optionally a pasteurization step, optionally a concentration step, optionally a pasteurization step, and a step of applying at least 50 bars.

In one embodiment, the ingredient obtained is either liquid or in the solid form, in particular in the powder form.

The following standards can be used in the context of the invention to determine TNM, protein and ash masses. ISO 8968-1/2014 "Milk and milk products—Determination of nitrogen content—Part 1: Kjeldahl principle and crude protein calculation"; NF EN ISO 8968-3 Oct. 2007 "Milk—Determination of nitrogen content—Part 3: Block-digestion method"; NF EN ISO 8968-4/June 2016 "Milk and milk products—Determination of nitrogen content—Part 4: determination of protein and non-protein nitrogen content and true protein content calculation"; NF V04-28 Oct. 1989 "Milk. Determination of ash. Reference method".

In one variant, the primary composition is obtained by mixing at least one liquid composition A comprising micellar caseins A1, at least one liquid composition B comprising milk serum proteins B1, and at least one liquid composition C comprising denatured milk serum proteins C1.

Preferably, liquid composition A comprising micellar caseins A1 has a solids by mass greater than or equal to 1%, more preferably greater than or equal to 5%, preferentially greater than or equal to 8%.

Preferably, liquid composition A comprising micellar caseins A1 has a solids by mass less than or equal to 50%, more preferably less than or equal to 40%, preferentially less than or equal 35%, especially less than or equal to 20%.

Preferably, the ratio of the TNM mass to the mass of the solids of liquid composition A is greater than or equal to 70%, more preferably greater than or equal to 80%.

Preferably, the ratio of the dry mass of micellar casein A1 to the mass of the solids of liquid composition A is greater than or equal to 80%, more preferably greater than or equal to 85%.

Preferably, liquid composition A has a pH comprised between 6.5 and 7.5.

Preferably, liquid composition B comprising milk serum proteins B1 has a solids by mass greater than or equal to 5%, more preferably greater than or equal to 15%, preferentially greater than or equal to 20%.

Preferably, liquid composition B comprising milk serum proteins B1 has a solids by mass less than or equal to 50%, more preferably less than or equal to 40%, preferentially less than or equal 35%, especially less than or equal to 30%.

Preferably, the ratio of the TNM mass to the mass of the solids of liquid composition B is greater than or equal to 70%, more preferably greater than or equal to 80%.

Preferably, the ratio of the dry mass of milk serum proteins B1 to the mass of the solids of liquid composition B is greater than or equal to 70%, more preferably less than or equal to 80%.

Preferably, the ratio of the dry fat mass to the solids of liquid composition B is greater than or equal to 2%, more preferably greater than or equal to 3%.

Preferably, liquid composition B has a pH comprised between 6.0 and 7.5.

Preferably, liquid composition C comprising denatured milk serum proteins C1 has a solids by mass greater than or equal to 1%, more preferably greater than or equal to 5%.

Preferably, liquid composition C comprising denatured milk serum proteins C1 has a solids by mass less than or equal to 50%, more preferably less than or equal to 30%, preferentially less than or equal 20%, especially less than or equal to 15%.

Preferably, the ratio of the total nitrogenous matter (TNM) mass to the mass of the solids of liquid composition C is greater than or equal to 50%, more preferably greater than or equal to 70%.

Preferably, the ratio of the dry mass of denatured milk serum proteins C1 to the mass of the solids of liquid composition C is greater than or equal to 65%, more preferably less than or equal to 80%, especially less than or equal to 75%.

Preferably, the ratio of the dry fat mass to the mass of the solids of liquid composition C is greater than or equal to 0.5%, more preferably greater than or equal to 1%.

Preferably, liquid composition C has a pH comprised between 6.0 and 7.0.

In one variant, micellar caseins A1 are a concentrate of casein protein A1, milk serum proteins B1 are a concentrate of milk serum proteins B1, and denatured milk serum proteins C1 are a concentrate of denatured milk serum proteins C1.

Preferably, liquid composition A is a concentrate of casein proteins A1, liquid composition B is a concentrate of milk serum proteins B1, and composition C is a concentrate of denatured milk serum proteins C1.

In one variant, the ratio of the dry mass of micellar caseins A1 to the mass of the total nitrogenous matter (TNM) of the ingredient is greater than or equal to 50%.

Preferably, the ratio of the dry mass of micellar casein A1 to the mass of the TNM of the ingredient is less than or equal to 85%, more preferably less than or equal to 65%.

In one variant, the ratio of the dry mass of milk serum proteins B1 to the mass of the TNM of the ingredient is comprised between 5% and 25%, preferably between 10% and 20%.

In one variant, the ratio of the dry mass of milk serum proteins C1 to the mass of the TNM of the ingredient is comprised between 10% and 45%, preferably between 20% and 30%, more preferably between 20% and 25%.

In one variant, the ratio of the mass of total nitrogenous matter (TNM) to the mass of the solids of the ingredient is greater than or equal to 50%, preferably less than or equal to 95%.

Preferably, the ratio of the TNM mass to the mass of the solids in the ingredient is greater than or equal to 80%, preferably less than or equal to 90%.

In one variant, the ratio of the dry lactose mass to the mass of the solids in the ingredient is greater than or equal to 0.1%, preferably less than or equal to 30%.

Preferably, the ratio of the dry lactose mass to the mass of the solids in the ingredient is greater than or equal to 1%, preferably less than or equal to 10%.

In one variant, the ratio of the dry fat mass to the total dry mass in the ingredient is comprised between 0.2% and 6%, preferably between 2% and 4%.

In one variant, the ratio of the TNM mass to the ash mass in the ingredient is comprised between 10% and 20%, especially between 10% and 15%.

In one variant, said production method comprises a pasteurization step performed during step ii).

The pasteurization step can be performed before the concentration step and/or before the step of applying at least 50 bars.

Preferably, the pasteurization step is the heat treatment step.

In one variant, said production method comprises a spray-drying step for obtaining a powder.

Spray-drying techniques consisting of transforming a liquid ingredient into a solid ingredient, especially in the powder form, are well known in the state of the art.

In one variant, liquid composition A or micellar caseins A1, in the liquid form during mixing i), comprise at least 50% by mass, preferably at least 70% by mass, relative to its solids by mass, of micellar caseins A1.

In one variant, liquid composition B or milk serum proteins B1, in the liquid form during mixing i), comprise at least 50% by mass, preferably at least 70% by mass, relative to its solids by mass, of milk serum proteins B1.

In one variant, liquid composition C or denatured milk serum proteins C1, in the liquid form during mixing i), comprise at least 50% by mass, preferably at least 60% by mass, relative to its solids by mass, of denatured milk serum proteins C1.

In one variant, the ratio of the dry mass of micellar caseins A1 to the solids by mass of the mixture of step i), is greater than or equal to 50%, preferably less than or equal to 85%, more preferably less than or equal to 70%, preferentially less than or equal to 65%.

In one variant, the ratio of the dry mass of milk serum proteins B1 to the solids by mass of the mixture of step i), is greater than or equal to 5%, preferably less than or equal to 35%, more preferably less than or equal to 25%, in particular less than or equal to 15%.

In one variant, the ratio of the dry mass of denatured milk serum proteins C1 to the solids by mass of the mixture of step i), is greater than or equal to 5%, in particular greater than or equal to 10%, more particularly greater than or equal to 15%, preferably less than or equal to 45%, more preferably less than or equal to 40%, more preferentially less than or equal to 35%, optionally less than or equal to 25%.

In one variant, the dry mass in denatured milk serum proteins C1 is greater, preferably of at least 1.5 times, than the dry mass in milk serum proteins B1 in the mixture of step i).

It has been observed, for example, for the production of high-protein yogurts, that if the mass proportion in protein B1 is greater than the mass proportion in protein C1 then the viscosity and firmness are too high. On tasting, the texture is so thick that it becomes pasty and unpleasant.

According to a second aspect, the present invention relates to an ingredient comprising the combination, notably the assembly, of at least three milk proteins comprising micellar caseins A1, denatured milk serum proteins C1, and milk serum proteins B1, that can be obtained by the implementation of the method according to any one of the variants of embodiment defined in reference to a first aspect of the invention.

According to a third aspect, the present invention relates to the use of the ingredient, in reference to the second aspect of the invention, or, obtained by the implementation of the method in reference to the first aspect of the invention, for the production of a dairy product chosen from at least one of the following lists: list I consisting of stirred yogurts, steamed yogurts, thermized yogurts, drinkable yogurts, yogurt mousses, stirred and steamed fermented milk, soft cheeses, fresh cheeses, stretched-curd cheeses, spreadable cheeses, uncooked pressed cheeses, semi-cooked pressed cheeses, cooked pressed cheeses, and any dairy product obtained by using a method comprising a coagulation step during which the pH is lowered, or a combination thereof, in particular from acidified and/or fermented dairy products; List II consisting of: dairy products which do not include a stage during which the pH is lowered, in particular processed cheeses, spreadable cheeses, ice creams, and dessert creams, or a combination thereof; and in List III consisting of: protein drinks, protein gels, protein bars, extruded products, or a combination thereof.

In the present text, the dairy product can be chosen indifferently from list I or II or III.

Cream cheeses are unripened, spreadable, rindless cheeses obtained from curds or a base obtained by lactic fermentation, serving as a base for certain processed cheeses to which one wishes to confer fresh aromatic notes. The dry mass content of fat relative to the total content (including water) is generally comprised between 18% and 30%, and its dry mass content in protein relative to its total mass (including water) is comprised between 4.5% and 8%.

Advantageously, the present invention permits obtaining a cream cheese whose dry fat mass relative to the total dry mass is less than or equal to 15%, preferably less than or equal to 11% (especially greater than 0%).

According to a fourth aspect, the invention relates to a dairy product chosen from at least one of the following lists: list I consisting of stirred yogurts, steamed yogurts, thermized yogurts, drinkable yogurts, yogurt mousses, stirred and steamed fermented milk, soft cheeses, fresh cheeses, stretched-curd cheeses, spreadable cheeses, uncooked pressed cheeses, semi-cooked pressed cheeses, cooked pressed cheeses, and any dairy product obtained by using a method comprising a coagulation step during which the pH is lowered, or a combination thereof, in particular from acidified and/or fermented dairy products; List II consisting of: dairy products which do not include a stage during which the pH is lowered, in particular processed cheeses, spreadable cheeses, ice creams, and dessert creams, or a combination thereof; and in List III consisting of: protein drinks, protein gels, protein bars, extruded products, or a combination thereof.

Said dairy product also comprises an ingredient obtained by the implementation of the method according to any one of the variants of embodiment in reference to the first aspect of the invention, or in reference to the second aspect of the invention.

In one variant, the dairy product is reduced in fat and/or enriched in milk protein.

In one variant, the ratio of the dry fat mass to the solids by mass of said dairy product is less than or equal to 15%.

In a sub-variant, the ratio of the dry mass the ingredient to the total mass (including water) in the dairy product is greater than 0% and less than or equal to 30%, preferably less than or equal to 20%, and optionally less than or equal to 15%.

The present invention will be better understood on reading the examples of embodiment and comparative examples described below, cited in a non-limited way, in support of the following figures, in which:

FIG. 1 shows the % of supernatant on the ordinate obtained for different protein concentrations in the mixtures tested by the liquid method (LM1, LM2) and by the dry method (DM1, DM2) and different temperature conditions, FIG. 2 is a graph showing on the ordinate the mass percentages of the proteins found in the supernatant fraction and in the fraction remaining in the bottom of the test specimen pellet of a mixture obtained by dispersing a powdered ingredient of the invention in water (LM1, LM2), on the one hand, and a mixture obtained by the dispersion of three protein powders (DM1, DM2) in water, on the other hand. Each of the mixtures comprises 10% by mass of protein relative to the total mass (including water) and is heated to 50° C. with stirring for one hour.

FIG. 3 shows the sensory profiles for cream cheese 1 and comparative cream cheese 1 on a scale of 0 to 4 for the 5 criteria evaluated: brittleness, mouthfeel, creaminess, firmness, and granularity.

FIG. 4 shows the sensory profiles for feta 1 and comparative feta 1 on a scale of 0 to 4.5 (by increments of 0.5) for the 5 criteria evaluated: brittleness, mouthfeel, creaminess, firmness, and granularity.

Figure 1:
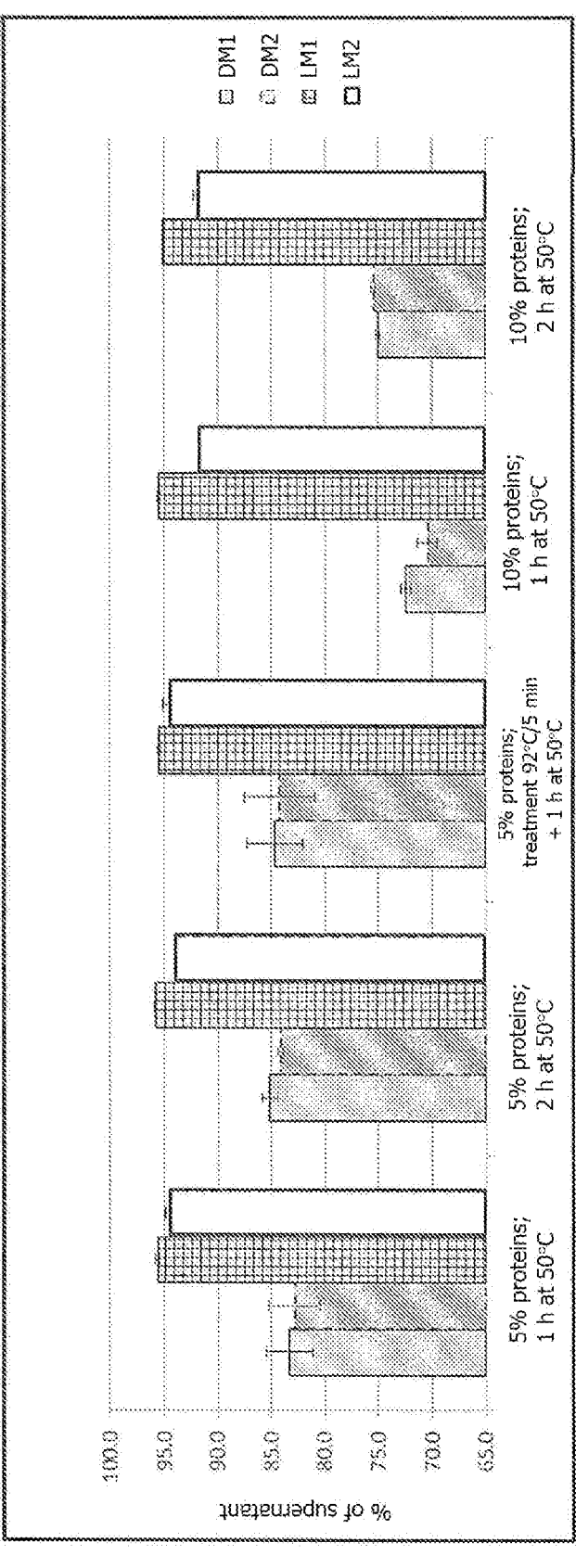

(I) INGREDIENT ACCORDING TO THE INVENTION a—Production of a Non-Limiting Example of an Ingredient According to the Invention (LM1, LM2, LM3)

A primary composition is prepared by mixing a liquid composition A comprising micellar caseins A1 (solids by mass of 12.5%; pH of 6.8; TNM mass/total dry mass of 89%; dry mass of micellar caseins/TNM mass of 92%, temperature of 5° C.), with a liquid composition B comprising undenatured milk serum proteins B1 (solids content by mass of 21%; pH of 6.6; TNM mass/total dry mass of 84%; temperature of 5° C.), and a liquid composition C comprising denatured milk serum proteins C1 (solids by mass of 7.1%; pH of 6.6; TNM mass/total dry mass of 84%; temperature of 5° C.). The ratio (by mass) between liquid compositions A, B and C is: 1.0:0.1:0.8

The mixture obtained is kept at a temperature of around 5° C. and a speed of around 200 RPM.

The primary composition obtained at the end of mixing step i) optionally undergoes a concentration step ii) to adjust the total dry mass during which the composition is heated at 45° C. for at least 5 minutes, especially under vacuum.

The primary composition obtained at the end of step i) or ii) then undergoes a step of applying pressure of at least 50 bars, by passage through at least one homogenization head applying 50 bars to the mixture. In this specific example, homogenization is done by a first head applying first 50 bars, then by a second head applying 50 bars, the mixture is then subjected to 100 bars. Homogenization can be done by a GEA Ariete homogenizer. The duration of homogenization is then simultaneous, notably at least one second.

The liquid ingredient is then obtained. The liquid ingredient then undergoes an atomization step by spraying by high pressure nozzles (approximately 200-300 bars). The ingredient is found in the powdered form and then corresponds to the powdered ingredient referenced LM1 in the remainder of this text.

The TNM mass of ingredient LM1 relative to its total dry mass is around 85%, the mass of micellar caseins A1 relative to the TNM mass is around 60%, the mass of proteins B1 relative to the TNM mass is around 15%, the mass of proteins C1 relative to the TNM mass is around 25%.

To obtain ingredient LM1, liquid compositions B and C come from cheese production and liquid composition A comes from membrane filtration of milk.

The same process and the same recipe are used for the preparation of an ingredient LM2 with the difference that liquid compositions A and B result from membrane filtration of milk and liquid composition C results from cheese production.

The same process and the same recipe are used for the preparation of an ingredient LM3 with the difference that method comprises a step of applying 50 bars by pumping the mixture of step i) using a high pressure pump for its supply to an atomization device to undergo an atomization step by spraying by high-pressure nozzles (200 bars at most).

b—Production of a Comparative Example

To produce a mixture of powders by the dry method (DM) the different sources of proteins in liquid form are used for the preparation of the primary composition (liquid compositions A, B and C): micellar caseins A1 (sold under the brand name PROMILK 872 B by INGREDIA), serum proteins B1, and denatured serum proteins C1 were dried independently of each other according to an atomization process known in the state of the art.

The three powders for the dry method are then mixed by following the recipe used for ingredients LM1 and LM2 to obtain comparative ingredients DM1 and DM2.

II—Rehydration Study

Rehydration protocol: The powders LM1, LM2, DM1 and DM2 are rehydrated at a mass concentration of 5% and 10% of proteins relative to the total mass of the mixture (including water). The powder is dispersed in demineralized water previously heated to 50° C. The powder is then dispersed with stirring via a turbine with a deflocculating paddle, then left with stirring in an oven at 50° C. for 1 or 2 hours. A sample mass (Me) is centrifuged (5 min at 300 G) leading to non solubilized material in the form of a pellet (Eppendorf). The supernatants (Ms) are weighed, and the amount of rehydration is determined by calculation according to the following formula (Ms/Me)*100, the results of which are reported in graph form in FIG. 1 attached.

Analyses of the mass contents of proteins are performed on the supernatant fraction and the fractions remaining in the test specimen pellet. These analyses are shown on the graph of FIG. 2.

Note that in FIG. 1 the mixtures of powders obtained by the liquid method (LM1, LM2) have clearly improved rehydration rates compared to the mixtures of powders obtained by the dry method (DM1, DM2), i.e. an improvement of approximately 11% for mixtures with 5% protein by mass, and about 22% for mixtures with 10% protein by mass, regardless of the heating time (1 hour or 2 hours) even combined with a further heating at 92° C. for 5 min. In fact, the different heat treatments do not improve the rehydration of dry mixes (DM1, DM2).

Figure 2:
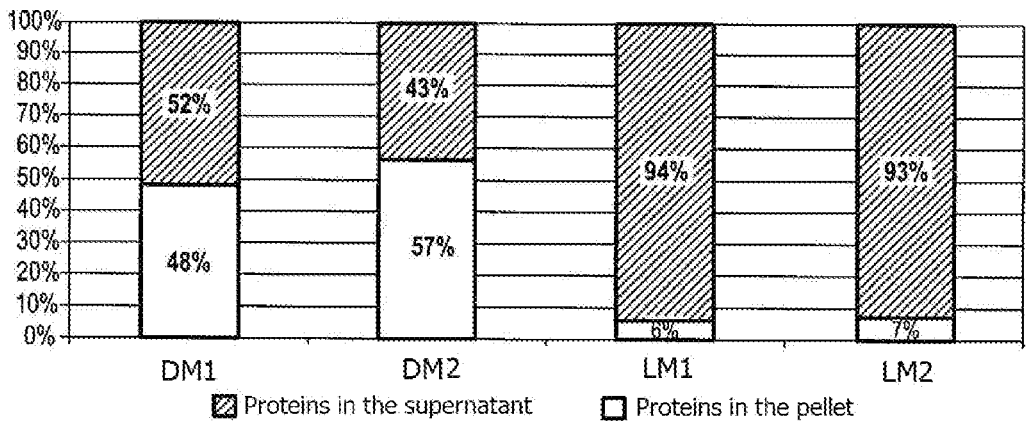

Note in FIG. 2 that in addition nearly 93% of the proteins of the mixture obtained by the dispersion of the powders formed by the liquid method (LM1, LM2) are found in the supernatant while only 43% or 52% of the proteins of the mixture obtained by the dispersion of the powders formed by the dry method (DM1, DM2) are found in the supernatant. The supernatant obtained by implementing the ingredient according to the invention in the powder form (LM1, LM2) is therefore of better quality than that (DM1, DM2) obtained by the combination of three powders A1, B1 and C1. This arrangement makes it possible to save protein and ensure that the properly solubilized combined proteins are effectively available for the improvement of the functional properties of food products.

III—Cream Cheese Production

The cream cheeses tested below are obtained by implementing the following method known as techno quark: mix the skimmed milk and the cream in the vat of a carousel at 50° C.; when the mixture reaches 50° C., add the protein powder with stirring (either the mixture of three powders by the dry method (DM1, DM2), or the ingredient according to the invention in powder form (LM1, LM2); leave to hydrate at 50° C. for 1 hour with gentle stirring; pasteurize the product obtained in a tubular pasteurizer (with preheating at 72° C., then a homogenization step at 72° C. at 100 bars (two homogenization heads, and 50 bars applied per homogenization head); chamber at 92° C. for 5 minutes; and cool to 32° C.); introduce the product into a disinfected bucket; add the ferments (10 g of ferment, type XT 208, per 100 kg of product to be treated), and rennet (Chymax+at a rate of 1.4 mL per 100 kg of product to be treated) and mix; incubate at 27° C. overnight; obtaining a quark; break the quark with a whisk and place 8 kg in the Stephan device; preheat to 50° C. with stirring; add 40 g of a stabilizing agent (for example Plus stabisil 3707-1) and 64 g of salt; heat treat at 82° C. for 5 seconds with stirring; homogenize the product through two homogenization heads applying 50 bars for the first, and 150 bars for the second; after homogenization, package in cream cheese jars and yogurt jars for the texture test. The functional properties, including texture and test, are evaluated 6 days after packaging and storage in a cold chamber at 4° C.

Cream cheeses comprising 8% by mass of protein in the solids were formulated according to the different compositions defined below in table 1 comprising the addition of an ingredient according to the invention LM1 and LM2, and the addition of a powder obtained by dry method combining three proteins A1, B1 and C1 (DM1, DM2).

TABLE 1

| Composition % (m/m) | Cream Cheese 1 | Cream Cheese 2 | Comparative Cream Cheese 1 | Comparative Cream Cheese 2 |
|---|---|---|---|---|
| Skim milk | 68.00% | 68.00% | 68.00% | 68.00% |
| Cream | 26.00% | 26.00% | 26.00% | 26.00% |
| Powder LM1 | 6.00% | | | |
| Powder LM2 | | 6.00% | | |
| Powder DM1 | | | 6.00% | |
| Powder DM2 | | | | 6.00% |

TABLE 2

| Composition % (m/m) | Cream Cheese 1 | Cream Cheese 2 | Comparative Cream Cheese 1 | Comparative Cream Cheese 2 |
|---|---|---|---|---|
| Total solids | 24% | 24% | 24% | 24% |
| Proteins | 8% | 8% | 8% | 8% |
| Lipids | 11% | 11% | 11% | 11% |
| Carbohydrates | 4% | 4% | 4% | 4% |

TABLE 3

| | Cream Cheese 1 | Cream Cheese 2 | Comparative Cream Cheese 1 | Comparative Cream Cheese 2 |
|---|---|---|---|---|
| Firmness (g) | 39 | 39 | 57 | 55 |
| Increase in firmness (%) | Reference | | +47% | +43% |

Firmness is tested using a TA.XTplusC texture analyzer, (Stable Micro Systems, UK). This texture analyzer evaluates the force (gram) necessary to deform the product by penetration. For cream cheese, we use a geometry referenced P5, at a product penetration speed of 1 mm/s, over a distance of 10 mm and an extraction speed of 1 mm/s.

The evaluated product is packaged in a plastic container of 170 mL between 8° C. and 10° C.

The product texture measurements show that the innovative method reduces the texture of cream cheese. Indeed, cream cheeses 1 and 2 according to the invention have a higher firmness of 43% to 47% relative to comparative cream cheeses 1 and 2.

Figure 3:
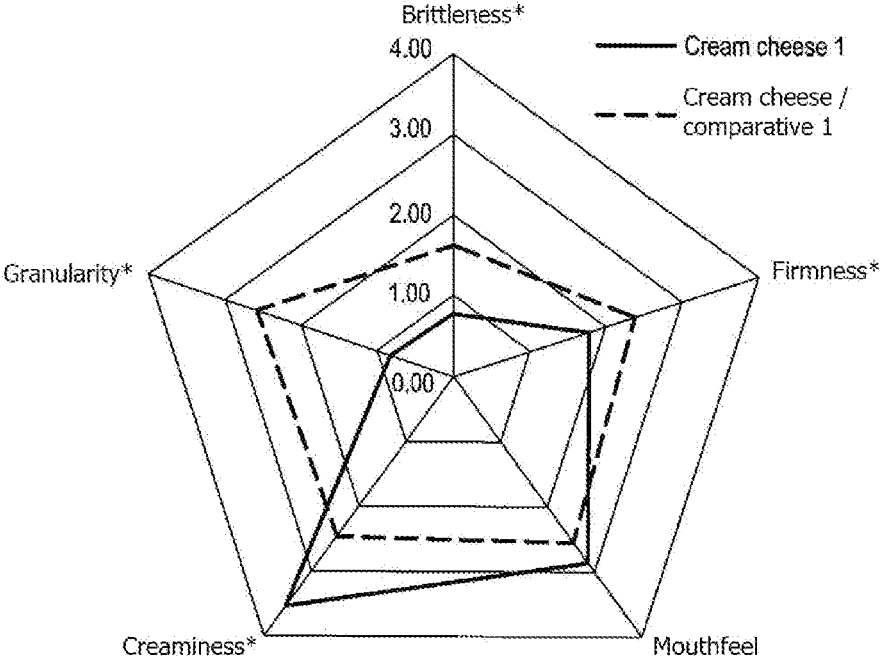

Tastings were performed on cream cheese 1 and on comparative cream cheese 1 using the following tests: triangle test according to standard NF ISO 4120: 2007 to establish whether products are considered to be different, preference test, and a descriptive analysis via a tasting to establish the sensory profiles reproduced in FIG. 3.

The triangle test relates to three anonymous tests presented to the people responsible for evaluating the sensory properties. In this test, it is stipulated that two of these three products are the same, and each tester must then identify the different product (forced choice: when the tester sees no difference, they must indicate a random choice). A certain number of correct responses for the two products are identified as different.

The number of testers is 22. For a relevance threshold set at 5%, the minimum number of correct responses necessary to conclude that there is a perceptible difference is 12 people.

Regarding the evaluation of the three products therefore comprising at least cream cheese 1 and comparative cream cheese 1, we obtain 16 correct answers and 6 wrong answers out of 22 answers given. Cream cheese 1 according to the invention and comparative 1 are therefore judged to be different.

To consolidate the results, a blind preference test between the 2 products is performed. Cream cheese 1 was then considered by 19 testers as melting better, being creamier and smoother and having a better mouthfeel than comparative cream cheese 1 considered too firm to the spoon and too gritty.

Finally, a testing is done according to standard ISO 22935: 2009. Five criteria to be analyzed are determined (Brittleness, Granularity, Creaminess, Mouthfeel, Firmness) and a panel of 22 tasters is invited to taste cream cheese 1 and comparative cream cheese 1.

The results are shown in FIG. 3 reproducing the sensory profiles of the cream cheeses tested. Cream cheese 1 exhibits better creaminess and mouthfeel than comparative cream cheese 1 and less granularity, firmness and brittleness than comparative cream cheese 1. For the cream cheese application, the ingredient according to the invention significantly improves the sensory properties and texture of cream cheese. The ingredient according to the present invention thus makes it possible to develop reduced fat cream cheeses (11% fat in this example) that exhibit improved taste and nutritional characteristics.

IV—Production of Light Feta

Feta is a curd cheese in brine from milk from the Balkans and Turkey, European PDO as of 2002. A major industry then developed, producing feta from a liquid pre-cheese (Mistry MMV process, Maubois 2004). Feta generally comprises 23% fat by mass relative to the total mass and light feta generally comprises between 9 and 10% fat by mass relative to its total mass. The feta produced below comprises 10% fat by mass relative to its total mass.

Three types of feta were produced: with the ingredient according to the invention (LM1), with powdered concentrates of micellar caseins A1 alone, and finally with powdered concentrates of denatured milk serum proteins C1 (as defined in Section I). The different compositions and test results are shown in Table 4 below.

The feta was produced by implementing the following process: mix and heat the skim milk and the cream to 50° C.; hydrate powdered LM2 or DM2 or micellar caseins A1 or denatured milk serum proteins C1 by adding them to the previous mixture of milk and cream at 50° C. for one hour, without stirring; heat the previous mixture to 70° C.; homogenize at 70° C. using two homogenization heads, the first head applying 150 bars and the second head applying 50 bars; heat treat for 15 seconds at 80° C.; cool the mixture to 40° C.; add salt with stirring to the mixture; add the ferments with stirring to the mixture (white dairy 80, 1 U/kg of feta); add the rennet with stirring (Chymax+, 14 mL pure/100 kg of the mixture) for approximately 30 minutes; and put in the oven for 16 hours at 32° C. The pH of the feta obtained is 4.6 to 4.8. The feta is stored at 4° C. and the analyses, including taste tests, are done 6 days after production.

Firmness is measured as described in Section II concerning the production of cream cheese with the following differences: cone geometry, at a product penetration speed of 3 mm/s, over a distance of 15 mm and an extraction speed of 10 mm/s. The evaluated product is packaged in a plastic jar of 365 mL. The texture measurements shown in Table 4 confirm that the combination of proteins A1, B1 and C1 by the liquid method make it possible to control the texture of feta while making feta creamier in the tasting.

TABLE 4

| Compositions of light feta | | With addition of an LM2 ingredient Feta 1 | With addition of micellar caseins | With addition of denatured serum proteins |
|---|---|---|---|---|
| Ingredients % by mass/ mass composition | Skim milk | 60% | 60% | 60% |
| | Cream | 25% | 25% | 25% |
| | Powder LM2 | 14% | — | — |
| | Casein rich powder | — | 14% | — |
| | Denatured serum protein rich powder | — | — | 14% |
| | Ferment & Rennet | Yes | yes | Yes |
| | Salt | 1% | 1% | 1% |
| Composition % mass/ total mass (including water) | % Total Solids | 31 | 31 | 32 |
| | % Total Nitrogenous Matter | 14 | 14 | 14 |
| | % Fat | 11 | 11 | 11 |
| Texture analysis | Firmness in g | 579 | 751 | 74 |
| | Standard deviation | 7.3 | 19.0 | 1.0 |
| | Difference in firmness | Corresponds to the reference | +30%/ reference | −87%/ reference |
| Taste | | Good milky taste Crumbly and creamy | Too granular Too dry, too firm | No texture To runny |
| | Preference (1 = product preferred): | 1 | 2 | 3 |

A comparative feta 1 was made according to the same process, and the same composition as that described in Table 4, as those used for the production of feta 1 according to the invention by using the DM2 powder, the production of which is described in I) a).

Figure 4:
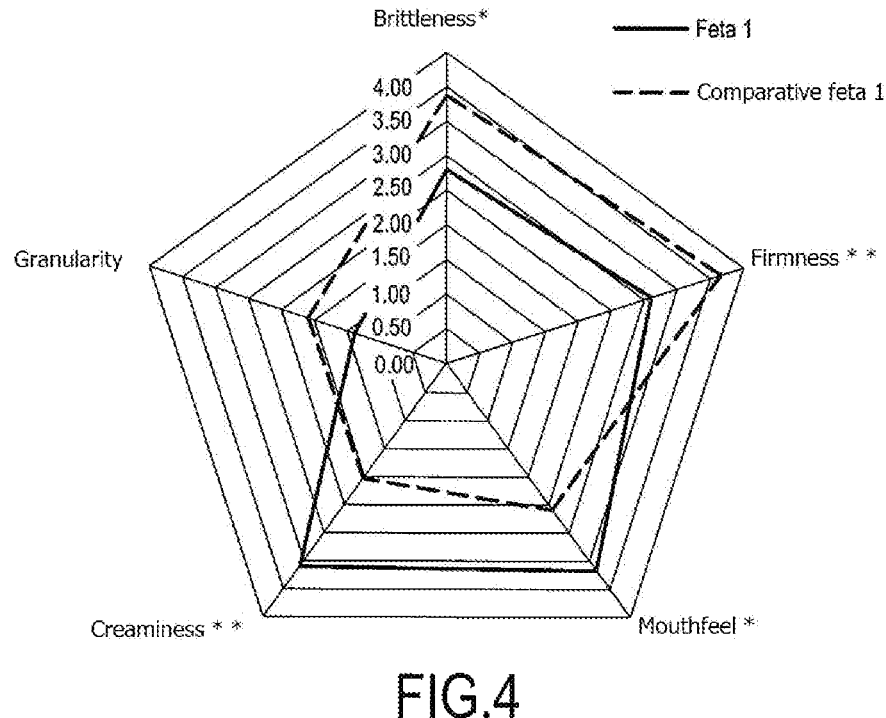

A triangle test such as the one described in Section II above is done on feta 1 according to the invention and comparative feta 1. The number of testers is 16. For a relevance threshold set at 5%, the minimum number of correct responses necessary to conclude that there is a perceptible difference between feta 1 and comparative feta 1 is 9 people. Accordingly, 11 correct responses and 5 incorrect responses were obtained out of 16 responses. Feta 1 and comparative feta 1 are therefore judged to be different. The preference test indicates that feta 1 is preferred by 15 tasters versus a single taster for comparative feta 1. The tasters who favored feta 1, judge it creamier, having a better taste, and being more unctuous than comparative feta 1, and also consider it more brittle. Sensory profiles for feta 1 and comparative feta 1 are also established according to ISO standard 22935:2009 and are shown in FIG. 4. The number of tasters is 16. Feta 1 was thus judged as being less brittle and having better mouthfeel than comparative feta 1. The ingredient according to the present invention thus advantageously makes it possible to develop reduced fat feta (11% fat in this example) that exhibits improved taste and nutritional characteristics.

V—Production of a Stirred Yogurt

According to CODEX STAN 243 international standards, yogurts and fermented milk must contain a minimum of 2.7% protein calculated by multiplying nitrogen by a factor of 6.38. They generally contain 4%.

Three types of stirred yogurt were produced: with the powdered ingredient according to the invention (LM1), with powdered concentrates of micellar caseins A1 alone, and finally with powdered concentrates of denatured milk serum proteins C1 (as defined in Section I). The different compositions and test results are shown in Table 5 below.

A fourth type of stirred yogurt was produced which is identical to that obtained with ingredient LM1, except that the ingredient LM1 is replaced by the ingredient LM3.

The stirred yogurts were produced by the implementation of the following method: mix the skim milk in the vat of a carousel at 50° C.; when the mixture reaches 50° C., add the powder LM1 or micellar caseins A1 alone or denatured milk proteins C1 with stirring; leave to hydrate at 50° C. for 45 minutes with gentle stirring, pass the mixture through the tubular pasteurizer (vapor pressure: 1.8 bars; counterpressure: 3 bars; preheat to 70° C., homogenize at 70° C. with a first homogenization head applying 50 bars then a second homogenization head at 100 bars, the booster pressure is 3.5 bars, chamber at 92° C. for 5 min, and cool to 48° C.); place the mixture in a sanitized bucket; add the ferments (YF-L812, 50 U/250 L of mixture) then mix; incubate at 43° C. for about 6 hours; stop incubation when the pH reaches 4.65 (+/−0.05); break the curd with a whisk; pass the mixture through a curd smoothing machine; pass the product through a yogurt smoothing machine; place the yogurt obtained in yogurt jars (125 mL) and store it in a cold room at 4° C. for at least 6 days before carrying out the tastings and various analyses.

The yogurt viscosity (cP) is measured by a Haake Viscotester VT7 (Thermo Scientific, USA) with an R6 geometry, at a shear speed of 100 RPM. The measurement is made by immersing the geometry to the limit indicated by the equipment (~⅓ of the height of the product). The measurement is done on 3 different samples resulting from the same production.

The product texture is measured using the TAXTplusC texture analyzer (Stable Micro Systems, UK) as defined in Section II with the difference that the geometry used is an extrusion disc referenced A/BE-d35, at a product penetration speed of 1 mm/s, over a distance of 30 mm and an extraction speed of 1 mm/s. The compositions and results of the tests carried out on stirred yogurt 1 and the comparative yogurts obtained with either micellar caseins A1 added alone or denatured serum proteins C1 are shown in Table 5 below.

TABLE 5

| Stirred yogurt compositions | | With addition LM1 Stirred yogurt 1 | With addition of micellar caseins Comparative yogurt | With addition of denatured serum proteins Comparative yogurt |
|---|---|---|---|---|
| Ingredients % by mass/ mass composition | Skim milk | 91.7% | 91.7% | 91.7% |
| | Powder LM1 | 8.2% | | |
| | Casein rich powder | | 8.2% | — |
| | Denatured serum protein rich powder | — | — | 8.2% |
| Composition % mass/ total mass (including water) | % Total solids | 17 | 17 | 17 |
| | % Total Nitrogenous Matter | 10 | 10 | 10 |
| | % Fat | 0.5 | 0.5 | 0.5 |
| Taste | | thickness, sheen, smoothness, creaminess | too thick, less shiny, dry | watery, grainy |

Figure 5:
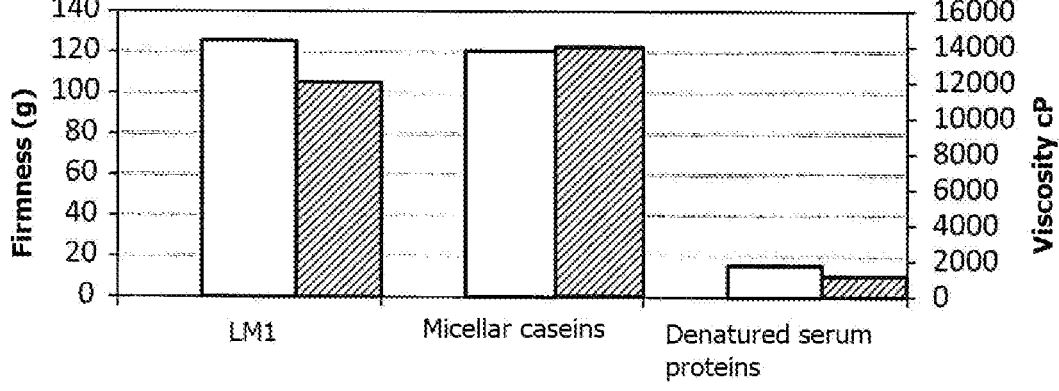
FIG. 5 shows the firmness (g) and viscosity (cP) obtained on the ordinate for a stirred yogurt 1 according to the invention, a comparative stirred yogurt in which only the powdered micellar caseins A1 have been added, and a comparative stirred yogurt in which only the powdered denatured C1 milk serum proteins were added on the abscissa.

The viscosity and firmness measurements are shown in FIG. 5. After the texture measurements indicated in FIG. 5, it is observed that the comparative stirred yogurts based on denatured serum proteins C1 are not sufficiently textured. This comparative yogurt is described as being watery in the mouth. Stirred yogurt 1 according to the invention offers firmness (in g) and viscosity (cP) close to those obtained for the comparative yogurt based on micellar caseins A1 alone. The yogurt obtained with ingredient LM3 has a texture of around 180 g.

Figure 6:
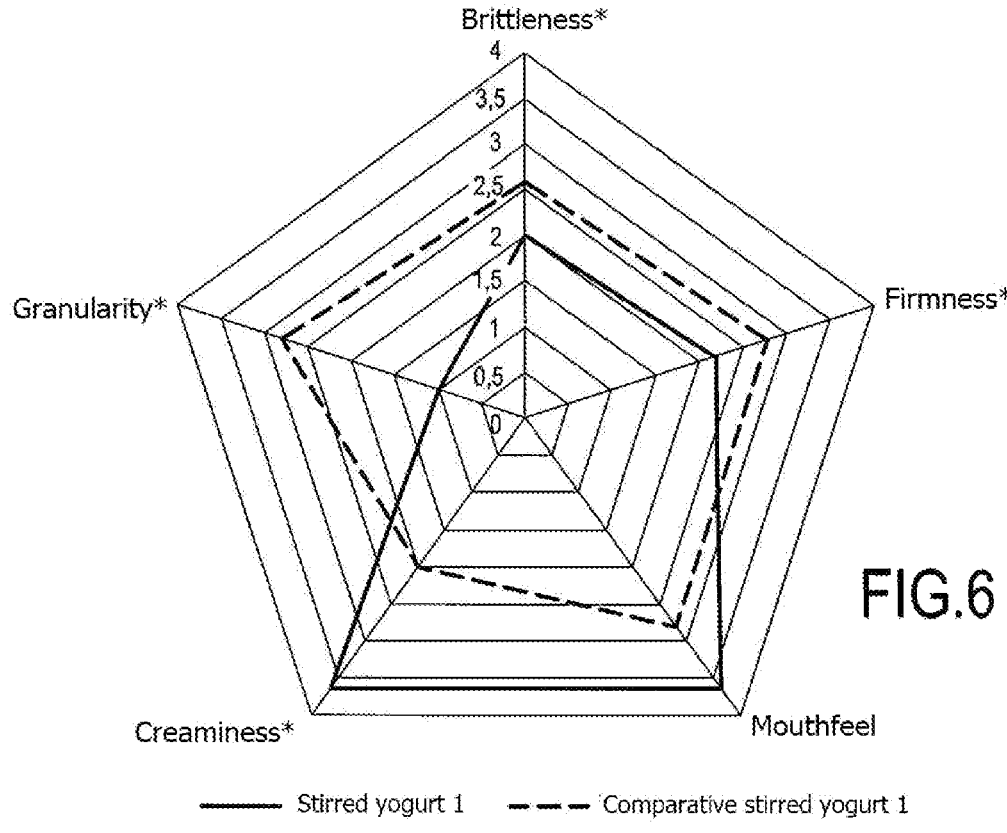
FIG. 6 shows the sensory profiles for a stirred yogurt 1 (invention) and comparative stirred yogurt based on micellar caseins A1 on a scale of 0 to 4 (by increments of 0.5) for the 5 criteria evaluated: dryness, mouthfeel, creaminess, firmness, and granularity.

The sensory profiles of high-protein yogurts are shown in FIG. 6 and indicate that stirred yogurt 1 is creamier, has a better mouthfeel and is less grainy than the comparative yogurt based on micellar caseins A1.

A comparative stirred yogurt 1 was made according to the same process, and the same composition as that described in Table 5, as those used for the production of stirred yogurt 1 according to the invention by using powder DM2, the production of which is described in I.

A triangle test such as the one described in Section II above is done on stirred yogurt 1 according to the invention and a comparative stirred yogurt 1. The number of testers is 19. For a relevance threshold set at 5%, the minimum number of correct responses necessary to conclude that there is a perceptible difference between stirred yogurt 1 and comparative stirred yogurt 1 is 11 people. Accordingly, 14 correct responses and 5 incorrect responses were obtained out of 19 responses. Stirred yogurt 1 and comparative stirred yogurt 1 are therefore judged to be different.

VI—Production of Fresh Cheeses

Fresh cheeses were produced by implementing the following process: mix the skimmed milk (i.e. 94.90% by mass of the composition) in the vat of a carousel at 50° C., when the mixture reaches 50° C., add powder LM1 or powder A1 (concentrate of micellar caseins) (i.e., 5.10% by weight of the composition) with stirring; leave it to hydrate at 50° C. for 45 minutes with gentle stirring; then pass the mixture through a plate pasteurizer (92° C./5 min); preheat it to 70° C., homogenize at 70° C. with a first homogenization head applying 50 bars then a second homogenization head at 100 bars, chamber at 92° C. for 5 minutes and cool to 32° C.; place the mixture in a sanitized bucket; add the ferments (Creamy 1.0, 10 U/100 kg) and the rennet (Chymax+1.4 ml/100 kg), then mix; incubate at 32° C. for 16 hours; stop incubation when the pH reaches 4.8 (+/−0.05); break the curd with a whisk; then put it in the curd smoother; place the cream cheese obtained in yogurt jars (125 g) and store it in a cold room at 4° C. for 6 days before tasting.

Figure 7:
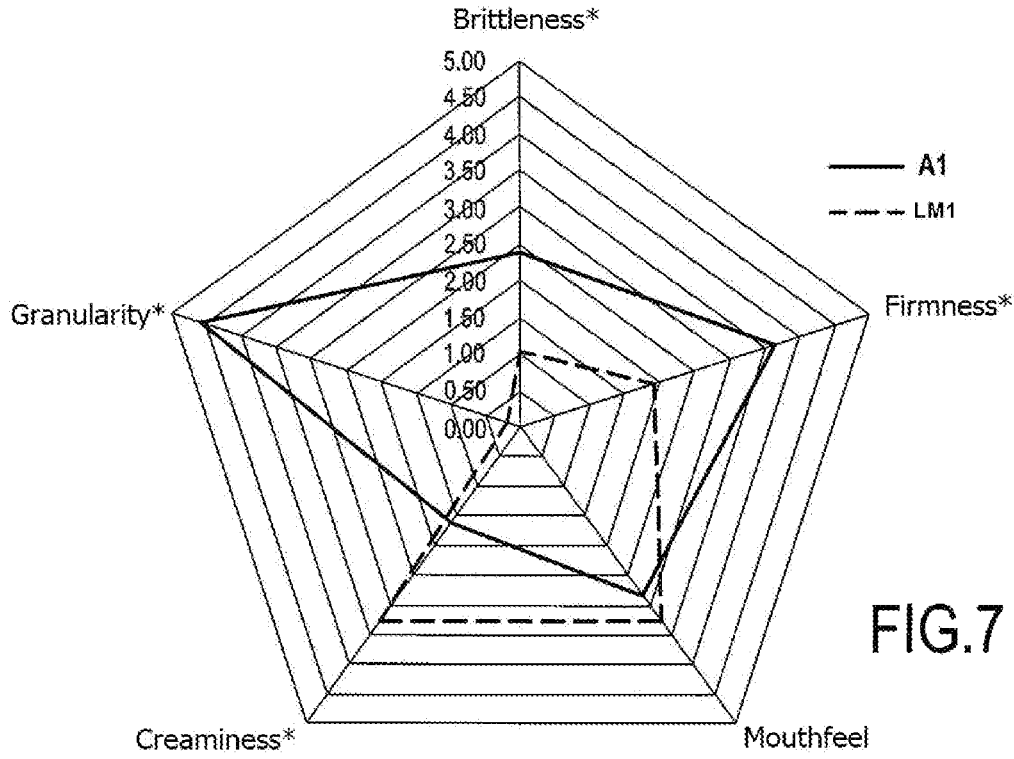
FIG. 7 shows the sensory profiles for a fresh cheese according to the invention (fresh cheese LM1) and a comparative stirred yogurt based on micellar caseins A1 on a scale of 0 to 5 (by increments of 0.5) for the 5 criteria evaluated: brittleness, mouthfeel, creaminess, firmness, and granularity.

The sensory profiles of the fresh cheeses are shown in FIG. 7. Fresh cheese LM1 is creamier, has a better mouthfeel, is less dry, not grainy and less firm than the comparative fresh cheese with micellar casein (A1).

The invention claimed is:

1. A method for producing an ingredient, said ingredient being used in the production of a dairy product, said ingredient comprising a combination of at least three milk proteins, the method comprising:

a mixing step (i) comprising mixing at least a primary liquid composition comprising all together: micellar caseins A1, native milk serum proteins B1 and denatured milk serum proteins C1, native milk serum proteins B1 being different from denatured milk serum proteins C1, said micellar caseins A1, native milk serum proteins B1 and denatured milk serum proteins C1 being mixed in liquid form to obtain a mixture;

said mixture having a ratio of the dry mass of native milk serum protein B1 relative to the mass of the solids of the mixture greater than or equal to 5% and less than or equal to 25%, and a ratio of the dry mass of denatured milk serum protein C1 to the mass of the solids of the mixture greater than or equal to 5% and less than or equal to 45%;

wherein the dry mass in denatured milk serum proteins C1 is greater of at least 1.5 times than the dry mass in native milk serum proteins B1 in the mixture, and a step ii) of applying at least 50 bars to the mixture of step i); and obtaining the ingredient, wherein:

a ratio of the dry mass of micellar caseins A1 to the mass of the total nitrogenous matter (TNM) of the ingredient is greater than or equal to 50%;

a ratio of the dry fat mass to the total dry mass in the ingredient is comprised between 0.2% and 6%.

2. The production method according to claim 1, wherein the primary composition is obtained by mixing at least one liquid composition A comprising micellar caseins A1, at least one liquid composition B comprising native milk serum proteins B1, and at least one liquid composition C comprising denatured milk serum proteins C1.

3. The production method according to claim 1, wherein micellar caseins A1 are a concentrate of casein proteins A1, native milk serum proteins B1 are a concentrate of native milk serum proteins B1, and denatured milk serum proteins C1 are a concentrate of denatured milk serum proteins C1.

4. The production method according to claim 2, wherein micellar caseins A1 represent at least 50% by mass of the solids content of liquid composition A.

5. The production method according to claim 2, wherein native milk serum proteins B1 represent at least 50% by mass of the solids content of liquid composition B.

6. The production method according to claim 2, wherein denatured milk serum proteins C1 represent at least 50% by mass of the solids content of liquid composition C.

7. The production method according to claim 1, wherein the ratio of the mass of total nitrogenous matter (TNM) to the solids by mass of the ingredient is greater than or equal to 50%.

8. The production method according to claim 1, comprising pasteurization prior to obtaining the ingredient.

9. The production method according to claim 1, comprising atomization for obtaining a powder prior to obtaining the ingredient.

10. The production method according to claim 2, wherein micellar caseins A1 represent at least 70% by mass of the solids content of liquid composition A.

11. The production method according to claim 2, wherein native milk serum proteins B1 represent at least 70% by mass of the solids content of liquid composition B.

12. The production method according to claim 2, wherein denatured milk serum proteins C1 represent at least 60% by mass of the solids content of liquid composition C.

13. The production method according to claim 1, wherein the ratio of the mass of total nitrogenous matter (TNM) to the solids by mass of the ingredient is greater than or equal to 80%.

14. The production method according to claim 1, wherein the primary liquid composition obtained in step i) is obtained by mixing at least two liquid compositions: a first liquid composition comprising micellar caseins A1 and native milk serum proteins B1, and a second liquid composition comprising denatured serum proteins C1.

15. The production method according to claim 1, wherein the primary liquid composition obtained in step i) is obtained by rehydration of at least a first powder and a second powder, each of said first and second powders is a milk protein concentrate chosen from among: a milk protein concentrate of micellar caseins A1, a milk protein concentrate of native serum proteins B1, and a milk protein concentrate of denatured serum proteins C1, or a mixture thereof, in a liquid milk protein concentrate, said liquid milk protein concentrate being chosen from among: a milk protein concentrate of micellar caseins A1, a milk protein concentrate of native serum proteins B1, and a milk protein concentrate of denatured serum proteins C1, or a mixture thereof.

16. The production method according to claim 1, wherein the ratio of the dry mass of micellar caseins A1 to the solids by mass of the mixture of step i), is greater than or equal to 50%, wherein the ratio of the dry mass of native milk serum proteins B1 to the solids by mass of the mixture of step i) is lower than or equal to 15%, the ratio of the dry mass of denatured milk serum proteins C1 to the solids by mass of the mixture of step i) is greater than or equal to 15%.

17. The production method according to claim 1, wherein the ratio of the dry mass of micellar caseins A1 to the solids by mass of the mixture of step i) is greater than or equal to 50%.

18. The production method according to claim 1, the step ii) of applying at least 50 bars comprises homogenizing the mixture from step i) by passing it through one or more homogenizing heads and/or pumping the mixture from step i) at high pressure, and wherein said method comprises furthermore an atomization step that comprises passing the mixture through one or more spray heads to obtain a powder.

19. The production method according to claim 1, wherein the primary composition is obtained by mixing at least one liquid composition A comprising micellar caseins A1, said liquid composition A being a liquid retentate obtained from a milk membrane filtration, at least one liquid composition B comprising native milk serum proteins B1, said liquid composition B being obtained from a liquid cheese production serum, and at least one liquid composition C comprising denatured milk serum proteins C1, said liquid composition C being obtained from a liquid cheese production serum which has undergone a denaturation step.

* * * * *